US010310079B1

(12) United States Patent
Um et al.

(10) Patent No.: US 10,310,079 B1
(45) Date of Patent: Jun. 4, 2019

(54) PRESENCE DETECTION USING WIRELESS SIGNALS CONFIRMED WITH ULTRASOUND AND/OR AUDIO

(71) Applicant: Amazon Technologies, Inc., Seattle, WA (US)

(72) Inventors: Koohyun Um, Sunnyvale, CA (US); Ce Zhang, Campbell, CA (US); Jungtao Liu, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/910,897

(22) Filed: Mar. 2, 2018

(51) Int. Cl.
*H04W 4/38* (2018.01)
*G01S 15/04* (2006.01)
*G06N 20/00* (2019.01)
*G08B 13/16* (2006.01)

(52) U.S. Cl.
CPC .............. *G01S 15/04* (2013.01); *G06N 20/00* (2019.01); *G08B 13/1627* (2013.01); *H04W 4/38* (2018.02)

(58) Field of Classification Search
CPC .......... G01S 15/04; H04W 4/38; G06F 15/18; G08B 13/1627
See application file for complete search history.

(56) References Cited

U.S. PATENT DOCUMENTS

| 2008/0077015 A1* | 3/2008 | Boric-Lubecke .... A61B 5/0205 600/453 |
| 2015/0220777 A1* | 8/2015 | Kauffmann ........ G06K 9/00362 382/103 |
| 2017/0123058 A1* | 5/2017 | Yavari ..................... G01S 13/56 |
| 2017/0312614 A1* | 11/2017 | Tran ....................... H04W 4/027 |
| 2018/0137374 A1* | 5/2018 | Gerardo Castro .......................... G06K 9/00805 |
| 2018/0306609 A1* | 10/2018 | Agarwal ................. H04L 67/12 |
| 2018/0336687 A1* | 11/2018 | Mudretsov .............. G06T 7/246 |
| 2018/0341818 A1* | 11/2018 | Steffanson .............. G06T 7/001 |

* cited by examiner

*Primary Examiner* — Joseph H Feild
*Assistant Examiner* — Rufus C Point
(74) *Attorney, Agent, or Firm* — Lowenstein Sandler LLP

(57) ABSTRACT

A method includes receiving, by a first wireless device, first data indicative of channel properties of a first communication link between the first wireless device and a second wireless device, the first wireless device and the second wireless device being located in a same vicinity. The method further includes detecting, using a supervised machine learning (ML) model applied to the first data, human movement and presence of stationary objects within the same vicinity and activating, by the first wireless device in response to detection of the human movement, an ultrasonic signal. The method further includes receiving, by the first wireless device, a reflected component of the ultrasonic signal and confirming, by the first wireless device using the reflected component, presence of a human in the same vicinity.

20 Claims, 11 Drawing Sheets

| Decision Results / Ground Truth | Idle | Presence |
|---|---|---|
| Idle | True Negative (TN)<br>- TN is detected with high confidence. | False Positive (FP)<br>- FP of WiFi detection may be reduced through presence confirmation with other sensing technique (ultrasound or acoustics). |
| Presence | False Negative (FN)<br>- FN may be reduced by analyzing a few samples over a longer time window, instead of making decision for each sample. | True Positive (TP)<br>- TP is detected with high confidence. |

PRESENCE DETECTION USING WIRELESS SIGNALS CONFIRMED WITH ULTRASOUND AND/OR AUDIO

BACKGROUND

Many buildings such as homes, retail stores, business centers, and the like, have a growing number of wireless transmission devices, including wireless transmitters and wireless receivers. These devices are sending an increasing amount of radio frequency (RF) energy through the buildings from many different directions. Wireless RF signals may be used in motion detectors to help detect human presence.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 8 is a decision mapping table to indicate disclosed solutions to the possibility of false-positive or false-negative presence detections, according to various embodiments.

DETAILED DESCRIPTION

Figure 1:
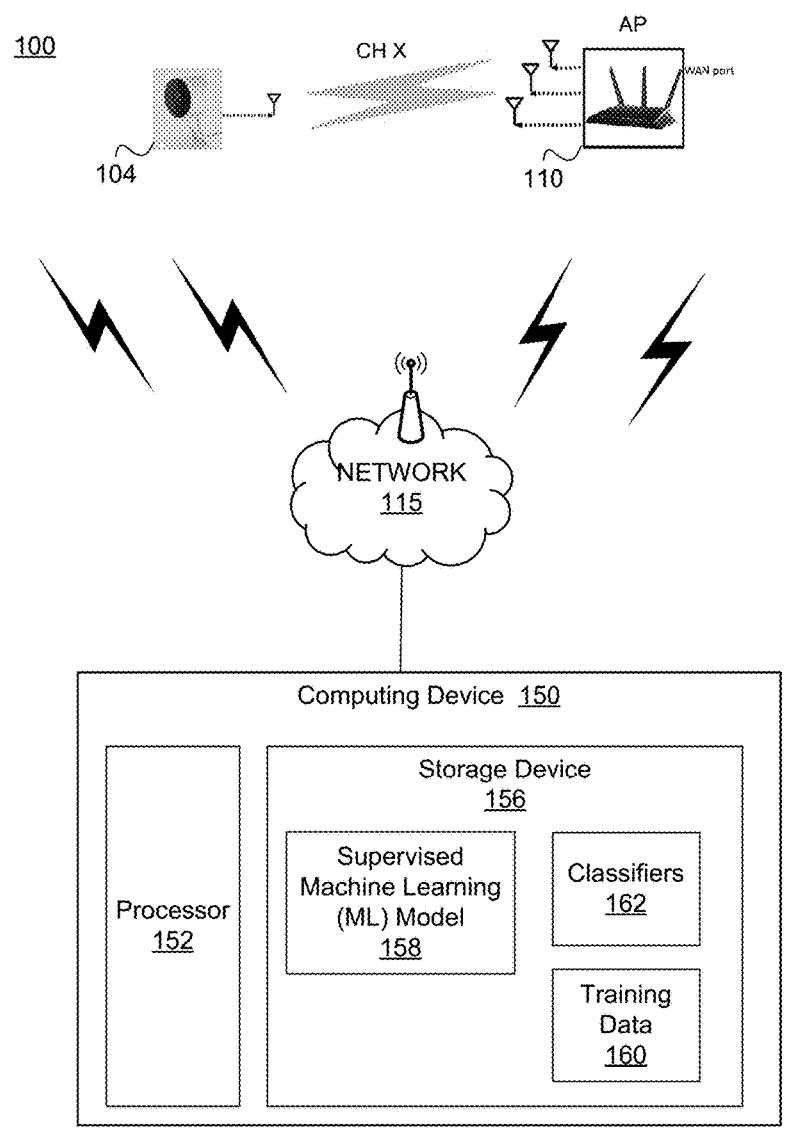
FIG. 1 is a block diagram of system for detecting presence of a human using wireless signals received from an access point, according to various embodiments.

A motion detector (e.g., a wireless detector) is a wireless device that detects moving objects, particularly humans. A motion detector may be integrated as a component of a system that automatically performs a task or alerts a user of motion in an area or vicinity. Accordingly, motion detectors may form a component of security, such as a burglar alarm system, of automated lighting control, home control, energy efficiency, and other useful systems.

The presence detection performed by motion detectors may be based on a number of different possible technologies, including, for example, passive infrared (PIR), microwave, ultrasonic, tomographic, video camera software, and gesture detection. A tomographic motion detector may sense disturbances to radio waves that pass from node to node in a mesh network. More generally, wireless radio frequency (RF) signals (or simply "wireless signals") may be employed to not only detect presence within line of sight, such as in the same room or space, but also in adjacent room(s) because wireless signals may pass through walls. These RF signals may be generated via a wireless local area network (WLAN) employing technology such as 2.4 GHz or 5.0 GHz WiFi®, Bluetooth®, ZigBee®, Zwave® and the like.

Accordingly, a motion detector that relies on wireless signals for presence detection but is intended to confine detection to a first location or single room may generate false positives. Confinement of detection to a first location or single room may be designed into a light switch sensor, for example, where only when someone present in the particular room will the light switch sensor in that room turn on the light in that room. Despite the possibility of false positives, use of wireless signals for presence detection may be an attractive option due to the ubiquity of wireless transceivers such as access points (AP) or base station devices that are present in so many buildings and homes.

Furthermore, the RF channel properties available through radio transmission channels may contain data that may be employed in machine learning techniques used to train, for example, a supervised machine learning (ML) model for presence classification. Examples of data that may carry RF channel properties include Received Signal Strength Indicator (RSSI) data, Channel State Information (CSI), or a combination of both, as will be discussed in more detail. Additional sources of signal characteristics, power, or channel properties or other channel information may also be employed, and therefore, RSSI and CSI are but a listing of understood and available forms of channel properties.

In various embodiments, to reduce the possibility of false positives, the present methods and systems (e.g., wireless detector) may confirm a presence detection, which was detected from classification of channel properties within wireless signals in a building, but through the use of ultrasonic signals and/or audio signals. The channel properties may be present in first data received within a communication link between the wireless detector, e.g., a first wireless device, and a wireless transmitter in an AP-type device, e.g., a second wireless device. The wireless detector may classify, by a processor of the wireless detector executing a supervised ML model, the first data to distinguish human movement within the building from stationary objects, to detect presence of a human. The wireless detector may further activate, by the wireless detector in response to detection of the human, an ultrasonic signal and/or an audio signal. The processor may then receive and process a reflected component of the ultrasonic signal (and/or the audio signal) to confirm the presence of the human at the first location or in a room occupied by the wireless detector. The wireless detector may then output a signal indicative of confirmed presence of the human in the room of the building. The output signal may be adapted to turn off the lights, signal a security system, or adjust a thermostat associated with the room in the building. By confirming presence in this way, false positives are reduces as is the need to also be activating ultrasonic or audio signals.

The disclosed wireless detector may also be designed to avoid a false-negative presence detection, e.g., due to the presence of a human who moves very little within the room. To do so, the wireless detector may continuously receive the first data and pre-process and perform presence detection on the first data at a time interval over a time period. For example, the wireless detector may repeatedly classify, at the time interval with execution of the supervised ML model, the first data to generate a plurality of presence decisions over the time period. The wireless detector may then, in response to a number of presence detections within the plurality of presence decisions exceeding a threshold number, output a signal indicative of confirmed presence of the human at the same vicinity or in the room of the building. In this way, data received over a period of time may be repeatedly classified with the supervised ML model before deciding that there is no one at the first location or in the room of a building.

In alternative embodiments, the disclosed wireless detector may not perform all of the classification or data processing. Alternatively, the wireless detector may transmit, wired or wirelessly, the first data to a second wireless device located within the room, elsewhere in the building, or in the cloud on a remote server. This second device may then perform the data processing and classification to perform the repeated presence detections. This second device may further receive any additional output signals from the wireless detector that a processed reflected component (from reflections of an ultrasonic and/or audio signal) indicates confirmation of presence of the human. In this way, the second device may receive the confirmatory signal and be able to output its own signal (e.g., to a light switch or security system) in response to presence confirmation. Additional or different embodiments are likewise possible as will be discussed in more detail.

FIG. 1 is a block diagram of system 100 for detecting presence of a human using wireless signals received from an access point, according to various embodiments. The system 100 may include a wireless detector 104, at least one access point device 110 that includes a transmitter of wireless signals, a network 115 (e.g., WLAN, WAN, or cellular), and a computing device 150. The wireless detector 104, which may be a WLAN receiver, may be located in a room (or other space) in or near a building in order to detect presence associated with the room (or other space). The access point device 110, which may be a WLAN transmitter, may transmit wirelessly over multiple channels, at least one of which is received by a receiver within the wireless detector 104. The access point device 110 may be in the same or a different room than the wireless detector 104.

In various embodiments, the wireless detector 104 may receive first data indicative of channel properties of a communication link between the wireless detector 104 and the access point device 110. The wireless detector 104 (or some remote device to which the first data is transmitted) may classify the first data to determine whether a human presence has been detected. This classification, as mentioned, may be performed using a trained supervised machine learning (ML) model, such as a support vector machine (SVM) model, a neural network (NN) model, or another trained ML model.

The computing device 150, located in the cloud across the network 115, may perform the initial training of the supervised ML model. The computing device 150 may include, for example, a processor 152 and storage device 156. The storage device 156, which may be understood to include computer memory and/or storage, may include a supervised ML model 158 (e.g., code for execution of the supervised ML model), training data 160, and pre-trained classifiers 162, which may be used in performing detection and location identification of persons within buildings. The pre-trained classifiers 162 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. In one embodiment, a classifier for a human may be trained to recognize human movement as distinguished from movement of pets or curtains.

The training data 160 may later be updated over time as people come and go through the room, and the data captured at the wireless detector 104 (and at other wireless detectors and receivers) within the building may include additional data, including channel properties, captured during periods of time in which the room may change, and particularly with reference to detecting people moving within the room. This updated training data may then be used to further train the pre-trained classifiers 162, so that further presence detection may be improved. For example, an updated supervised ML model 158 may be transmitted periodically by the computing device 150 to the wireless detector 104 (or to a remote second device) used to perform classification to determine human presence in the future.

Employing trained ML models to perform presence detection may be performed on different types of channel property data, including Received Signal Strength Indicator (RSSI) data, Channel State Information (CSI), or a combination of both. Additional sources of signal characteristics, power, or channel properties or other channel information may also be employed, and therefore, RSSI and CSI are but a listing of understood and available forms of channel properties.

Accordingly, in one embodiment, the wireless detector 104 may receive and transmit RSSI, which is a parameter (e.g., channel properties) that has a value of zero ("0") to a RSSI maximum value (referred to as "RSSI Max"), and is indicative of the signal strength of a wireless signal associated with a wireless network. Accordingly, RSSI is a measurement value of power present in received wireless signals, and contains a single value per packet. For example, RSSI can be measured as the power level of a radio frequency that a client device receives from an access point, such as a wireless router. In another implementation, RSSI may be a measurement of the energy observed at the antenna by a wireless physical layer (PHY) of the receiver used to receive a current Physical Layer Convergence Protocol (PLCP) Protocol Data Unit (PPDU) of the receiver. In one implementation of a home wireless local area network (WLAN) (e.g., using the WiFi® technology), for example, the wireless detector 104 may generate the RSSI either based on a data frame received or a beacon from an AP node.

The RSSI may fluctuate when the environment changes. Such changes can be caused by many factors, such as moving a transmitter or receiver, moving objects nearby the AP or client, a change in ambient noise level, temperature swings, or other such factors that cause fluctuations in RSSI.

In another embodiment or implementation, the wireless detector 104 may measure and transmit CSI, which is data that includes channel properties of a communication link between a transmitter and a receiver. For example, a receiver within the wireless detector 104 may retrieve the CSI from a baseband channel estimator with which to perform presence detection. The receiver may adjust the rate of sampling channel properties by the baseband channel estimator. The CSI may include a detailed channel impulse response with both amplitude and phase information across all the Orthogonal Frequency Division Multiplexing (OFDM) subcarriers and be updated (at the maximum rate) every OFDM symbol. This may provide more information about the environment under surveillance, and thus may improve detection capability when applying a trained ML model, as discussed herein, to CSI data or CSI-liked data.

Figure 2A:
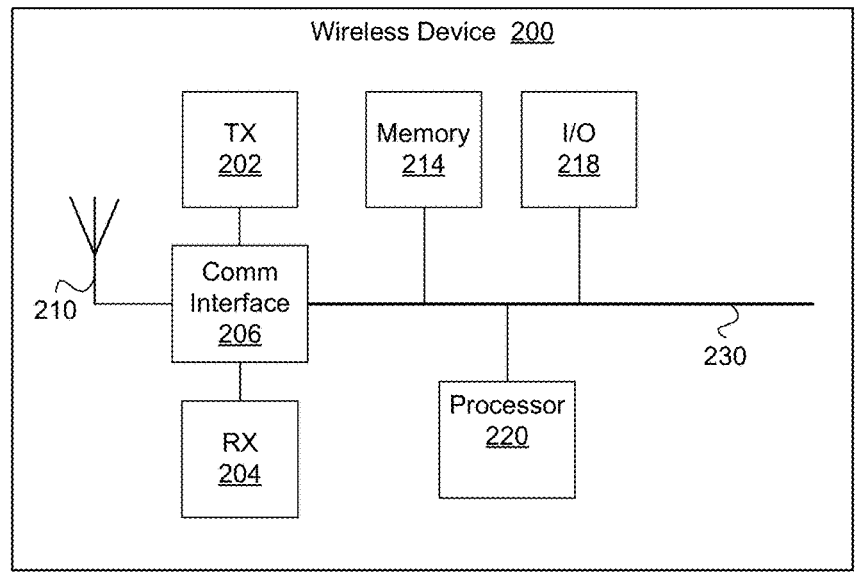
FIG. 2A illustrates a wireless device adapted to detect and transmit channel state information (CSI) or received signal strength indicator (RSSI) data useable by a supervised machine learning model to perform presence detection, according to various embodiments.

FIG. 2A illustrates a wireless device 200 adapted to detect and transmit channel state information (CSI) or received signal strength indicator (RSSI) data useable by a supervised machine learning model to perform presence detection, according to various embodiments. Accordingly, the wireless device may represent the wireless detector 104 or the access point device 100 in different embodiments. The wireless device 200 may include, but not be limited to, a transmitter (TX) 202 (e.g., a WLAN transmitter), a receiver (RX) 204 (e.g., a WLAN receiver), a communications interface 206, one or more antenna 210, a memory 214, one or more input/output (I/O) devices 218, and a processor 220. These components may all be coupled to a communications bus 230. The memory 214 may include storage in which to store the supervised ML model 158, e.g., a SVM or a NN model.

In one embodiment, the receiver 204 receives first data indicative of channel properties of a first communication link between the wireless device 200 and a wireless transmitter in the access point device 110, both of which are located in a building. In one embodiment, the processor 220 may be configured to direct the TX 202 to transmit the first data, which includes the channel properties, to a remote computing device (e.g., the computing device 150) over the network 115 for supervised ML processing. The processor 220 may further be configured to perform pre-processing of the first data and to classify the pre-processed first data as detecting either a stationary object (e.g., which may be known already to be stationary) or detecting a moving object such as a human, as will be discussed in detail with reference to FIGS. 5-10.

In various embodiments, the I/O devices 218 may include an ultrasonic transceiver adapted to radiate ultrasonic signals and to detect reflected components of the ultrasonic signals. The I/O devices 218 may further include an audio transceiver adapted to radiate audio signals and to detect reflected components of the audio signals. In additional embodiments, the I/O devices 218 may include an input device such as a microphone for detecting sound that may detect the reflected components of the ultrasonic signals and/or the audio signals. The microphone may also detect human voices, for purposes of voice recognition. The I/O devices 218 further include a speaker, e.g., for purposes of communicating with a person based on the voice recognition. The processor may receive audio data through the microphone and transmit audio through the speaker in response to the audio data and also in response to presence indicators.

The antennas (such as the antenna 210) described herein within various devices may be used for Long Term Evolution (LTE) frequency bands, third generation (3G) frequency bands, Wi-Fi® and Bluetooth® frequency bands or other wireless local area network (WLAN) frequency bands, including Zigbee®, Z-wave™ or the like, wide area network (WAN) frequency bands, global navigation satellite system (GNSS) frequency bands such as global positioning system (GPS) frequency bands, or the like.

Figure 2B:
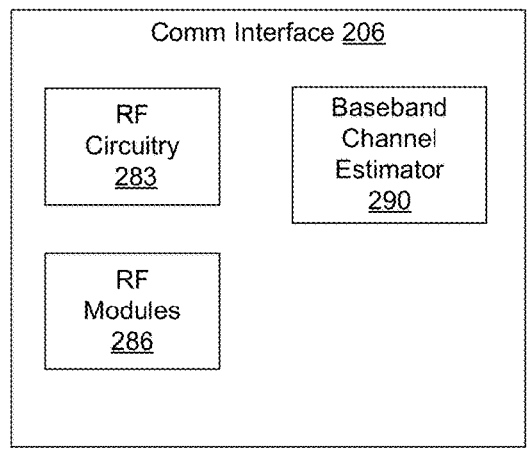
FIG. 2B is a block diagram of a detailed example of the communications interface 206 of FIG. 2A according to one embodiment.

FIG. 2B is a block diagram of a detailed example of the communications interface 206 of FIG. 2A according to one embodiment. As illustrated in FIG. 2B, the communications interface 206 may further include RF circuitry 283, a set of RF modules 286, and a baseband channel estimator 290. A more detailed and alternative embodiment of a wireless device will be discussed with reference to FIG. 8. In one embodiment, one of the RF modules 286 may include a WiFi® PHY at which the RF energy of received RF signals may be measured for purposes of RSSI. The baseband channel estimator 290, by virtue of being incorporated within the communications interface 206, may be coupled to the antenna 210, the TX 202, and to the RX 204, and be adapted to estimate the CSI (or the RSSI) for each channel. As discussed, the CSI includes a detailed channel impulse response (e.g., containing channel properties) with both amplitude and phase information across all the OFDM subcarriers and is updated (at the maximum rate) every OFDM symbol. This provides more information about the environment under surveillance, and thus provides excellent detection capability when applying a supervised ML model, as discussed herein, to CSI data.

The wireless device 200 may, in various embodiments, continuously upload RSSI or CSI data to the computing device 150 (FIG. 1) for use in supervised ML model processing, or may buffer the RSSI or CSI data in the memory 214 (or other computer storage) and then periodically upload the RSSI or CSI data at a predetermined time interval. This data may allow the computing device 150 to perform updates to training of the supervised ML model 158 as will be discussed in more detail with reference to FIG. 5. In one embodiment, the wireless device 200 (or a co-located computing system) is adapted to include sufficient memory, storage, and processor power to be able to directly perform pre-processing and classification with the supervised ML model 158 discussed herein.

In some embodiments, the wireless device 200 (or co-located computing system) may contain sufficient processing power to perform updates to training of the supervised ML model 158, and thus may work independently of access to cloud-based resources. These updates may be made using newly received data containing channel properties that confirm or fail to confirm the accuracy of the pre-trained classifiers 162, which are trained as a part of the supervised ML model 158.

Figure 3:
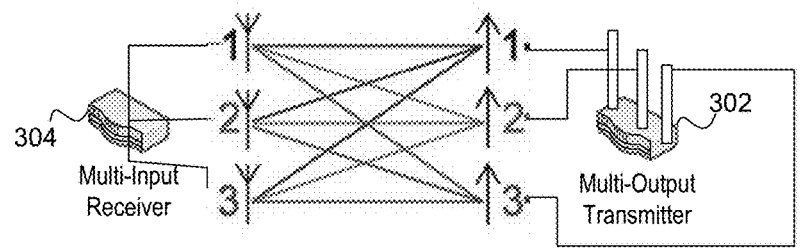
FIG. 3 is a block diagram of a multi-input receiver and a multi-output transmitter in communication, according to one embodiment.

FIG. 3 is a block diagram of a multi-input receiver 304 and a multi-output transmitter 302 in communication, according to one embodiment, to represent how CSI operates. The standard Institute for Electrical and Electronics Engineers (IEEE) 802.11n was established in 2007 to boost the range and throughput of WiFi® service. In IEEE 802.11n, multiple-in, multiple-out (MIMO) OFDM is used and the physical layer presents a value to estimate the channel status in each subcarrier, e.g., the CSI for each subcarrier. The CSI may therefore be expressed as:

$$H = \begin{bmatrix} h_{11} & h_{12} & \ldots & h_{1N_r} \\ h_{21} & h_{22} & \vdots & h_2N_r \\ \vdots & \vdots & \vdots & \vdots \\ h_{N_t1} & h_{N_t2} & \vdots & h_{N_tN_r} \end{bmatrix} \quad (1)$$

where $$H(f_k) = |H(f_k)|e^{j\angle H(f_k)} \quad (2)$$

The term H($f_k$) represents the CSI value at the subcarrier level with frequency $f_k$. |H($f_k$)| denotes the amplitude and ∠H($f_k$) the phase in the subcarrier. The CSI describes how a signal propagates between the transmitter and the receiver device in both amplitude and phase. The CSI also reveals the combined effect of scattering, fading, and power decay with respect to a distance of the received signals.

Figure 4A:
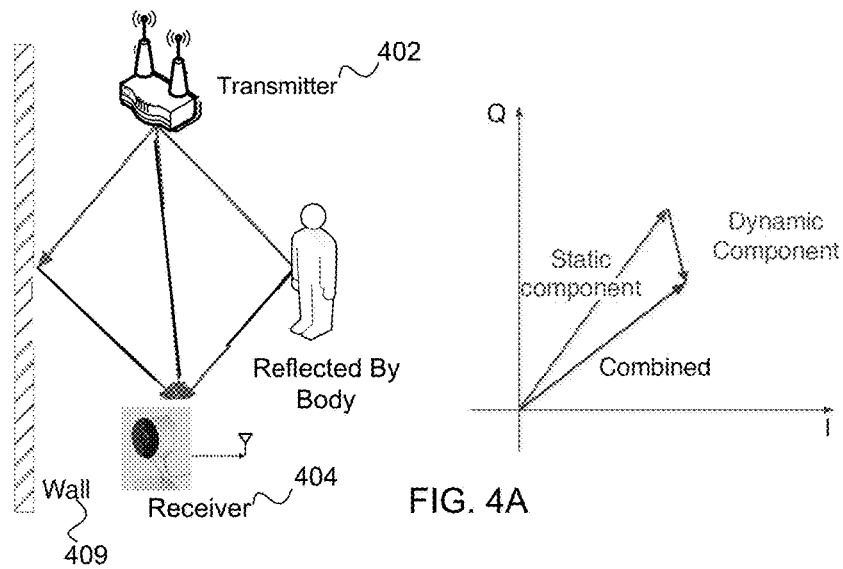
FIG. 4A is a reflection diagram of wireless signals between a transmitter and a receiver with a stationary human in a room, according to one embodiment.
Figure 4B:
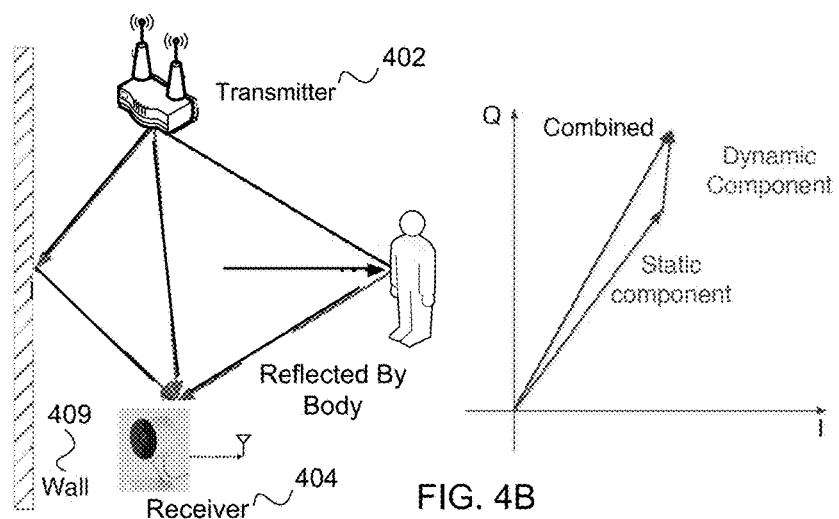
FIG. 4B is a reflection diagram of wireless signals between transmitter and receiver with a moving human in the room, according to one embodiment.

FIG. 4A is a reflection diagram of wireless signals between a transmitter 402 and a receiver 404 with a stationary human, according to one embodiment. FIG. 4B is a reflection diagram of wireless signals between the transmitter 402 and the receiver 404 with a moving human (e.g., $d_k$(t)), according to one embodiment. In one example, the transmitter 402 may be the multi-output transmitter 302 (e.g., a second wireless device) and the receiver 404 may be the multi-input receiver 304 (e.g., a first wireless device).

The transmitter 402 may transmit in many directions, including a line of sight (LoS) path as well as paths that reflect off of objections, such as a wall 409. Signal propagation may also be disturbed by human motion, and different motion activity may return different characteristics in the CSI data. In this way, machine learning may be used to classify the presence of the human. Equation (3) may depict the CSI data within a static channel, e.g., within a communication link that includes no human movement. Equation (4) may detect the CSI data within a combination of a static channel and dynamic channel, where a portion of the CSI data indicates human movement.

$$H(f, t) = e^{-j2\pi\Delta ft} \sum_{k=1}^{N} a_k(f, t)e^{-j2\pi f\tau_k(t)} \quad (3)$$

$$H(f, t) = e^{-j2\pi\Delta ft}\left(H_s(f) + \sum_{k\in P_d} a_k(f, t)e^{-j\frac{2\pi d_k(t)}{\lambda}}\right) \quad (4)$$

where $H_x$(f) in Equation (4) is the static channel component.

Figure 5:
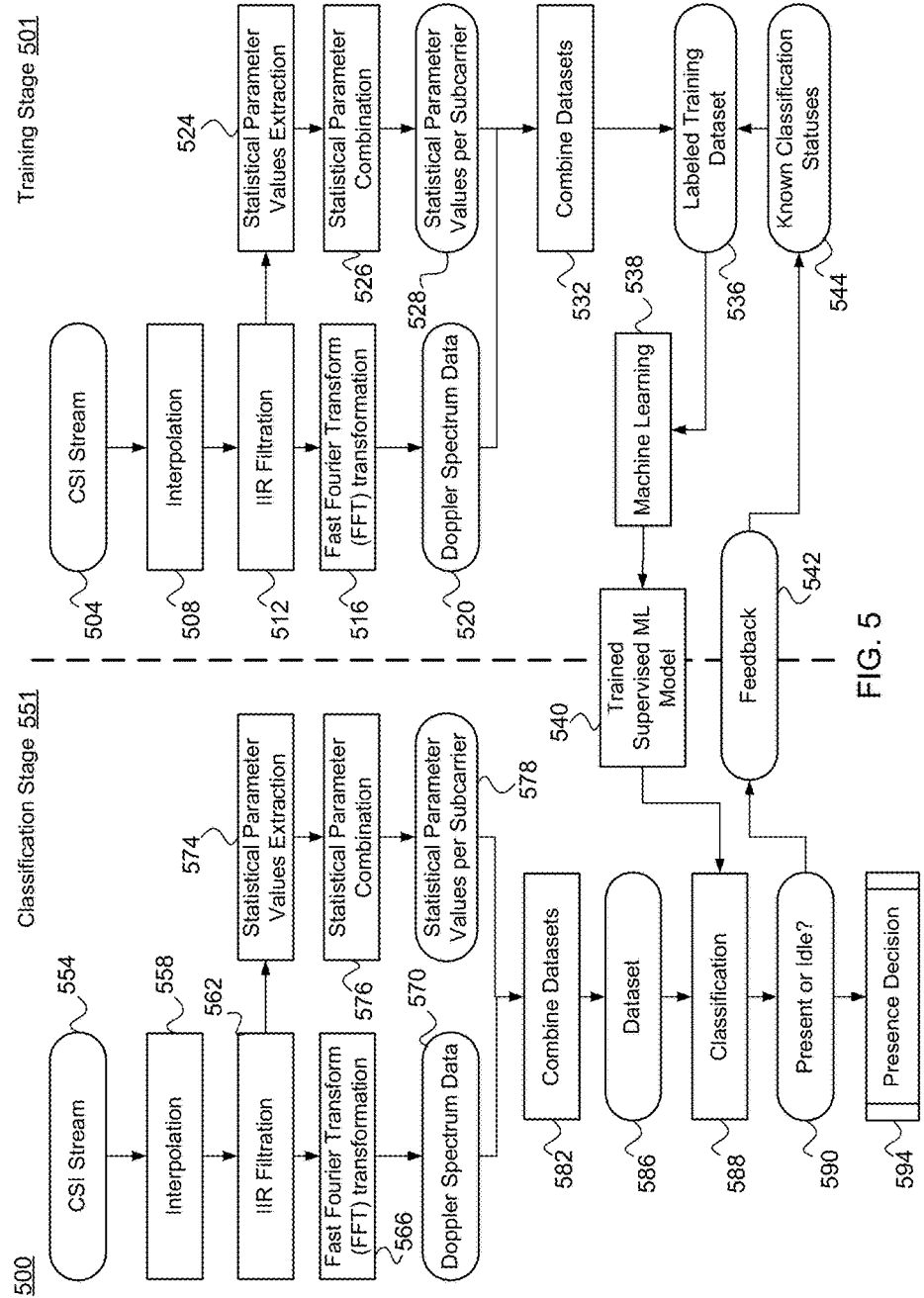
FIG. 5 is a flow diagram of a method including a training stage and a classification stage to, respectively, train a supervised machine learning (ML) model and to apply the trained ML model to classify pre-processed data to perform presence detection, according to various embodiments.

FIG. 5 is a flow diagram of a method 500 including a training stage 501 and a classification stage 551 to, respectively, train a supervised machine learning (ML) model and to apply the trained ML model to classify pre-processed data to perform presence detection, according to various embodiments. Method 500 may be performed by processing logic that may comprise hardware (e.g., circuitry, dedicated logic, programmable logic, microcode, etc.), software (such as instructions running on the processor), firmware or a combination thereof. In one embodiment, a processor of the wireless detector 104, of the computing device 150, or of the wireless device 200 performs the method 500. Alternatively, other components of a disclosed device may perform some or all of the operations of the method 500.

With further reference to FIG. 5, the method 500 may begin with the processing logic, within the training stage 501, receiving initial data indicative of channel properties of a communication link between a wireless receiver (e.g., in the wireless detector 104) and a wireless transmitter (e.g., in the AP device 110) (504). In one embodiment, the initial data is a CSI stream, but RSSI data may also be included. The initial data may be captured from a room within a building during an initial training phase used to train the supervised ML model 158 before employing the supervised ML model for presence detection.

The method 500 may continue with the processing logic performing interpolation of the initial data to obtain interpolated data (508). The interpolated data may include equidistant data points that embody the channel properties, e.g., to provide a smoothing affect to the initial data, e.g., CSI data. The method 500 may continue with the processing logic filtering the interpolated data with an infinite impulse response (IIR) filter to generate filtered data having reduced noise compared to the interpolated data (512). Such an IIR filter may include feedback from an output of the IIR filter, and which may therefore be known as a recursive digital filter. The filtering performed by the IIR filter may further include a non-linear phase characteristic. In other embodiments, another type of filter may be used. The interpolation and the filtering at blocks 508 and 512 may be performed to generate pre-processed data, and additional pre-processing steps are envisioned.

Given a complex-numbered CSI stream h(k, $t_n$) for $k_{th}$ subcarrier index sampled at time $t_n$, the magnitude of h(k, $t_n$) over time period T has N samples and can construct an $N_{sc} \times N$ matrix H.

$$H = \begin{bmatrix} |h(1, t_1)| & \ldots & |h(1, t_N)| \\ \vdots & \ddots & \vdots \\ |h(N_{sc}, t_1)| & \ldots & |h(N_{sc}, t_N)| \end{bmatrix} \quad (5)$$

The matrix, H, of Equation (5) may include the interpolated and filtered data spanning various data points over time for the $k_{th}$ subcarrier index.

With continued reference to FIG. 5, the method 500 may continue with the processing logic executing a fast Fourier transform (FFT) on the pre-processed data to generate a data stream in the frequency domain, e.g., that contains frequency domain information of the pre-processed data (516). The fast FFT is a discrete Fourier transform algorithm that reduces the number of computations needed for N points from $2N^2$ to 2NlgN, where lg is the base-2 logarithm. In one embodiment, a one-dimensional FFT with $N_{th}$ points may be applied to each row of the matrix of Equation (5) to result in the following Doppler spectrum matrix, $H_{freq}$, given as Equation (6).

$$H_{freq} = \begin{bmatrix} |\tilde{h}(1, f_0)| & \ldots & |\tilde{h}(1, f_{N_{fft}-1})| \\ \vdots & \ddots & \vdots \\ |\tilde{h}(N_{sc}, f_0)| & \ldots & |\tilde{h}(N_{sc}, f_{N_{fft}-1})| \end{bmatrix} \quad (6)$$

where h(k, $f_n$) is the $n_{th}$ frequency component for $k_{th}$ subcarrier index after FFT.

The data within the Doppler spectrum matrix may therefore be indicative of shifts in incoming received waves over a multipath channel, e.g., as discussed in relation to FIGS. 3, 4A, 4B. These shifts in turn indicate movement of an object (e.g., a human) across time and space. For example, the $n^{th}$ reflected wave with amplitude ($c_n$) and phase ($\phi_n$)

arrive from an angle ($\alpha_n$) relative to the direction of movement of the human. The Doppler shift of this wave may be expressed as:

$$\Delta f_n = \frac{v}{\lambda}\cos\alpha_n \tag{7}$$

where $v$ is the speed of the human that is moving. The data points within the Doppler spectrum matrix may therefore include the information for determining human presence based on reflected wireless signals from a moving human.

The method 500 may continue with the processing logic extracting frequency components from the data stream in the frequency domain, e.g., the Doppler spectrum matrix, $H_{freq}$, which are indicative of movement of a human, to generate Doppler spectrum data (520). For example, in one embodiment, the frequency components of direct current (DC) and above 30 Hz may be dropped out to reduce the size of an input feature vector (discussed below) as only motion is useful info for classification. Then the matrix values may stacked into a one-dimensional vector as illustrated in Equation (8).

$$Y_{freq} = [|H(1,f_1)| \ldots |h(1,f_{30Hz})| \ldots |h(N_{sc},f_1)| \ldots |h(N_{sc},f_{N_{fft}})|] \tag{8}$$

Additional reference will be made to this one-dimensional vector later.

With continued reference to FIG. 5, the method 500 may continue with the processing logic extracting, from the filtered data for the subcarrier, statistical parameter values over a time period and within the time domain (524). The statistical parameter values may include one or more of a maximum value, a minimum value, a mean value, a variance value, an entropy value, a mean cross rate value, a skewness value, or a kurtosis value, each of which is defined in more detail below. The method 500 may continue with the processing logic combining these statistical parameter values into a second one-dimensional vector (526), to generate a combined vector of the statistical parameter values for each subcarrier (528).

The statistical parameter values may be useable as feature values to define the supervised ML model 158, particularly in the case of an SVM model. More specifically, by combining the time-domain-based statistical parameter values as features, a machine learning classifier may separate new testing data in a hyper-dimensional plane with more accuracy. If the regularization technique is utilized to generate a SVM machine learning model, the contribution or weighting of these features may be emphasized or de-emphasized with hyper-parameters (e.g., statistical parameters per hyperplane for each subcarrier) to avoid the overfitting in the optimization process upon application of the supervised ML model 158.

In various embodiments, the maximum and minimum values per subcarrier may be the maximum and minimum value of magnitude of complex CSI $h(k, t_n)$ over time period T. The mean value of $h(k, t_n)$ per subcarrier over time period T may be defined as $$\mu(k) = \frac{1}{N}\sum_{t_n \in T} |h(k, t_n)| \tag{9}$$

In one embodiment, the variance value per subcarrier may be defined as $$\text{var}(k) = \frac{1}{N-1}\sum_N [|h(k, t_n)| - \mu]^2 \tag{10}$$

where there are N samples for the time period T.

The magnitude of $h(k, t_n)$ over time period T may have N samples and can construct a $N_{sc} \times N$ matrix H like a two-dimensional image, given in Equation (11).

$$H = \begin{bmatrix} |h(1,t_1)| & \ldots & |h(1,t_N)| \\ \vdots & \ddots & \vdots \\ |h(N_{sc},t_1)| & \ldots & |h(N_{sc},t_N)| \end{bmatrix} \tag{11}$$

From the matrix, H, the processing logic may remove the stationary objects within the scene through the subtraction of the mean of sampled time period ($H_{mean}$) and normalize the data to a grayscale image (all entries are between 0 and 1) $I_{gray}$.

In one embodiment, the processing logic CSI entropy value may be computed with the formula of the image entropy $$\text{Entropy} = -\sum_{All(m,n)} I_{gray}(m,n) * \log_2(I_{gray}(m,n)) \tag{12}$$

where (m,n) is the entry of $m_{th}$ row and $n_{th}$ column of gray scale image. Mean cross rate value per subcarrier may count the number of crossings (in the positive direction) of $h(k, t_n)$ through the mean valued $\mu$ for the specified time period, T.

Skewness is a measure of the asymmetry of the data around the sample mean. If skewness is negative, the data are spread out more to the left of the mean than to the right. If skewness is positive, the data are spread out more to the right. The skewness value of the normal distribution (or any perfectly symmetric distribution) is zero.

In one embodiment, therefore, the skewness feature per subcarrier may be defined as expressed in Equation (13).

$$s(k) = \frac{\frac{1}{N}\sum_N [|h(k,t_n)| - \mu]^3}{\left\{\sqrt{\frac{1}{N}\sum_N [|h(k,t_n)| - \mu]^2}\right\}^3} \tag{13}$$

Kurtosis is a measure of how outlier-prone a distribution is of a dataset. The kurtosis value of the normal distribution is three. Distributions that are more outlier-prone than the normal distribution have a kurtosis value greater than three, e.g., distributions that are less outlier-prone have kurtosis values less than three. Kurtosis may be expressed by the following Equation (14).

$$Kr(k) = \frac{\frac{1}{N}\sum_N [|h(k,t_n)| - \mu]^4}{\left\{\frac{1}{N}\sum_N [|h(k,t_n)| - \mu]^2\right\}^2} \tag{14}$$

With continued reference to FIG. 5, the method 500 may continue with the processing logic combining (e.g., stacking) the feature values (within the second vector) with the Doppler spectrum data (within the first vector) within a one-dimensional (1D) resultant vector, e.g., one-dimensional vector (532). The method 500 may continue with the processing logic labeling the data points within the 1D resultant vector with known classification statuses (544), to generate a labeled training dataset (536). The labeled training dataset may continue to be updated through future feedback from the classification stage 551 (542). The method 500 may continue with the processing logic performing supervised machine learning using the labeled training dataset, to generate a trained supervised machine learning model (540). The trained supervised ML model may then be applied during classification as will be explained.

In various embodiments, the training stage 501 may be performed offline, e.g., by the computing device 150 within the cloud. The method blocks 508 through 532 may be referred to as data pre-processing, e.g., the preparation of the CSI stream for machine learning according to a supervised ML model such as support vector machines (SVM) or other classification-based or regression-based learning models.

In machine learning, support vector machines (SVMs, also support vector networks) are supervised learning models with associated learning algorithms that analyze data used for classification and regression analysis. Given a set of training examples, each marked as belonging to one or the other of at least two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

In addition to performing linear classification, SVMs may efficiently perform a non-linear classification using what is called the kernel trick, implicitly mapping their inputs into high-dimensional feature spaces. When data are not labeled, supervised learning is not possible, and an unsupervised learning approach may be instead be employed, which attempts to find natural clustering of the data to groups, and then maps new data to these formed groups. The clustering algorithm that provides an improvement to the SVMs is called support vector clustering and is used in industrial applications either when data are not labeled or when only some data are labeled as a preprocessing for a classification pass.

With continued reference to FIG. 5, the method 500 may continue with the processing device, within the classification stage 551, receiving first data indicative of channel properties of a communication link between a wireless receiver (e.g., in the wireless detector 104) and a wireless transmitter (e.g., in the AP device 110) (554). In one embodiment, the first data is a CSI stream, but RSSI data may also be included. This "first" data may be data received in real time and for which a presence detection is to be performed with reference to the room in the building. The method 500 may also be extended to cover additional rooms within the building. As will be apparent, the pre-processing steps within the classification stage 551 match those performed during the training stage 501; accordingly, detailed explanations will not be repeated with reference to the latter.

The method 500 may continue with the processing logic performing interpolation of the first data to obtain interpolated data (558). The interpolated data may include equidistant data points that embody the channel properties, e.g., to provide a smoothing affect to the first data. The method 500 may continue with the processing logic filtering the interpolated data with an infinite impulse response (IIR) filter to generate filtered data having reduced noise compared to the interpolated data (562).

With continued reference to FIG. 5, the method 500 may continue with the processing logic executing a fast Fourier transform (FFT) on the filtered data to generate a data stream in the frequency domain (566). The method 500 may continue with the processing logic extracting frequency components from the data stream in the frequency domain, e.g., the Doppler spectrum matrix, $H_{freq}$, which are indicative of movement of a human, to generate Doppler spectrum data (570). The frequency components may include data points located between DC and approximately 30 Hz.

The method 500 may continue with the processing logic extracting, from the filtered data for the subcarrier, statistical parameter values over a time period and within the time domain (574). The statistical parameter values may include one or more of a maximum, a minimum, a mean, a variance, entropy, a mean cross rate, skewness, or kurtosis, each of which was defined above. The method 500 may continue with the processing logic combining these statistical parameter values into a one-dimensional vector (576), to generate a combined vector of the statistical parameter values for each subcarrier, where the statistical parameter values are useable as features values to define the supervised ML model (578). The method 500 may continue with the processing logic stacking the statistical parameter values with the Doppler spectrum data within a one-dimensional (1D) resultant vector, e.g., a larger one-dimensional vector containing the feature values (582), to generate a dataset for the supervised ML model 158 that includes both time domain and frequency domain values (586).). For example, the method 500 may stack the variance with the Doppler spectrum according to Equation (15). Similarly, other statistical parameters from Equation (9)-(14) may be stacked to obtain a larger size feature vector for ML.

$$Y_{feature}=[|\tilde{h}(1,f_1)| \ldots |\tilde{h}(1,f_{30Hz})| \ldots |\tilde{h}(N_{sc},f_1)| \ldots |\tilde{h}(N_{sc},f_{N_{fft}})|\text{var}(1) \ldots \text{var}(N_{sc})]$$

$$Y_{feature}=[|\tilde{h}(1,f_1)| \ldots |\tilde{h}(1,f_{30Hz})| \ldots |\tilde{h}(N_{sc},f_1)| \ldots |\tilde{h}(N_{sc},f_{N_{fft}})|\text{var}(1) \ldots \text{var}(N_{sc})] \quad (15)$$

With continued reference to FIG. 5, the method 500 may continue with the processing device classifying, via execution of the trained supervised ML model (540), data of the dataset to distinguish the movement within the building from stationary objects (588), which results in a presence detection or detection of idle channels (590). The presence detection may be indicative of the presence of a human. In one embodiment, the pre-processing of blocks 574, 576, 578, and 582 are skipped. While skipping the inclusion of time-domain statistical parameters may create a less rich dataset, such a simplified embodiment may still be employed and thus classification may be performed on the Doppler spectrum data (instead of the dataset) using the supervised ML model.

The method 500 may continue with the processing logic outputting a presence decision with reference to at least a portion of the incoming CSI stream (594). In one embodiment, the presence decision is binary, e.g., "presence detected" or "presence not detected," although in other embodiments the decision may be indicated with a non-binary value. As will be discussed in further detail, a plurality of presence decisions may be output over a shifting time window, to avoid a false-negative detection.

Figure 6:
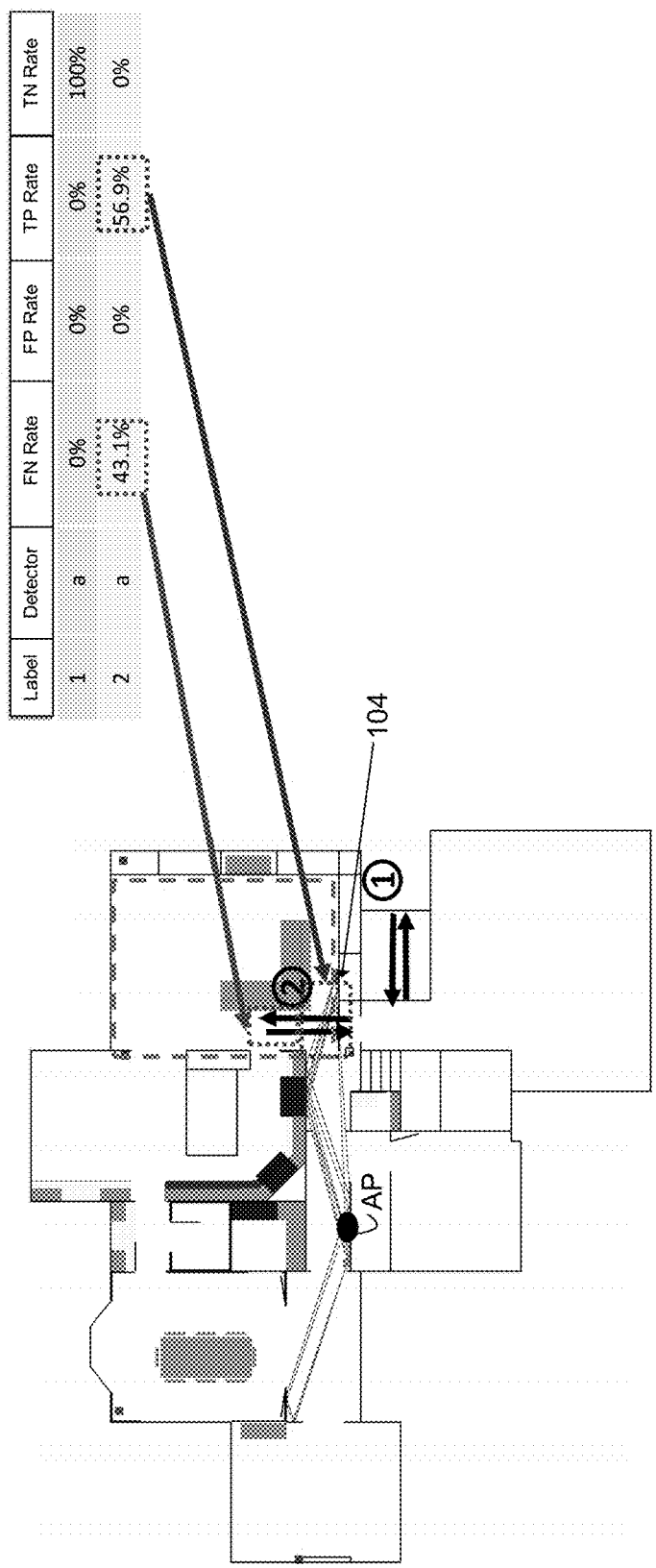
FIG. 6 illustrates an example set of rooms in a building to show potential false-presence detection due to a multi-room scenario, according to one embodiment.

FIG. 6 illustrates an example set of rooms in a building to show potential false presence detection due to a multi-room scenario, according to one embodiment. Illustrated are the 25 propagation paths with the highest received power at a wireless detector 104. In FIG. 6, the example movement of Case 1 may be understood as movement in a hallway outside of the room in which is located the wireless detector 104. The example movement of Case 2 is detected when the human crosses the propagation paths. The movement of Case 1 may not be detected because the human is not crossing a significant propagation path from the access point (AP) device. Accordingly, there would be no false alarm with Case 1, as noted with the true negative rate of 100%.

Figure 7:
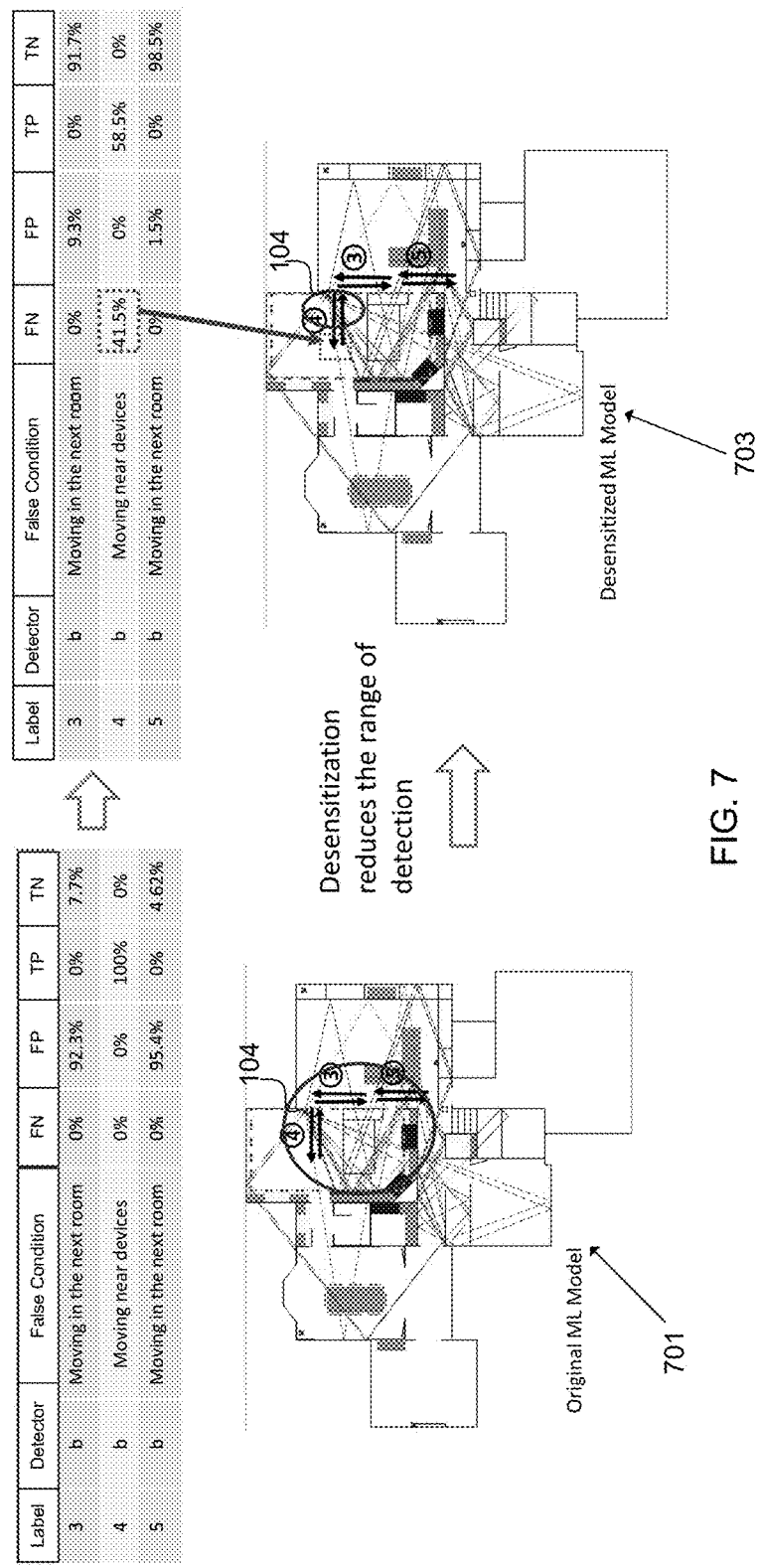
FIG. 7 illustrates an example set of rooms in a building to show potential false-presence detection due to a multi-room scenario, according to another embodiment.

FIG. 7 illustrates an example set of rooms in a building to show potential false-presence detection due to a multi-room scenario, according to another embodiment. The example of FIG. 7 is more complicated that the example of FIG. 6. Although still illustrating the 25 propagation paths with the highest received power at the wireless detector 104, the detector 104 is positioned such as to receive many more reflected wireless signals. According, there are a higher number of propagation paths that humans may cross in movement throughout several of the multiple rooms.

Note that, in the illustrated embodiment, the original ML model 701 results in a high incidence of false positives because it picks up significant movement in rooms outside of the room in which is located the wireless detector 104. Accordingly, the original ML model is desensitized by reducing the range of detection, to generate a desensitized ML model 703, as an attempt to improve detection only within the room of the wireless detector 104. The desensitized ML model 703, however, although resulting in a much lower rate of false positives, now incurs a much higher rate of false negatives. Any number of false positives or false negatives is to be avoided.

FIG. 8 is a decision mapping table 800 to indicate disclosed solutions to the possibility of false-positive or false-negative presence detections, according to various embodiments. Note that the decision mapping table 800 is set up with decision results along columns and the ground truth in the first column. As expected with detection using wireless signals, presence is detected with high confidence in true negative (TN) and true positive (TP) scenarios. Note, however, that false positives (FP) and false negatives (FP) are to be reduced to increase detection confidence in these scenarios.

False positive (FP) detection may be reduced via the employment of wireless detection (e.g., with the use of WiFi® technology to capture CSI or CSI-like data) combined with confirmation through another sensing technique such as ultrasound or acoustics. Furthermore, false negatives (FP) may be reduced by analyzing a few samples over a longer time window, instead of relying on a decision for each sample. In other words, when a plurality of decisions within that time window exceed a determined threshold number of decisions, the disclosed wireless detector or system may trigger an action based on confirmed presence (e.g., trigger a light switch, a thermostat, or signal a security system).

Figure 9A:
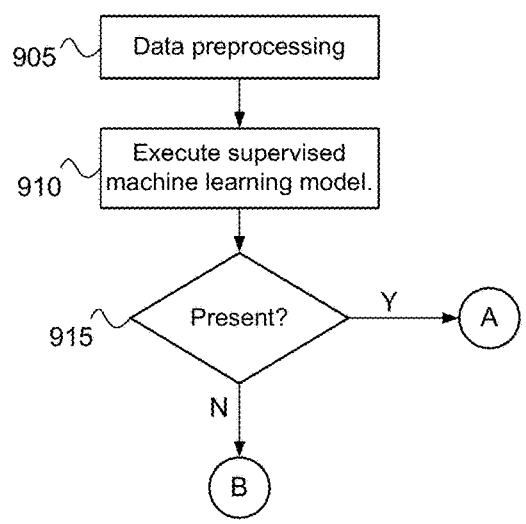
FIG. 9A is a flow diagram of a method for generating presence decisions through execution of a supervised ML model on newly received data, according to one embodiment.
Figure 9B:
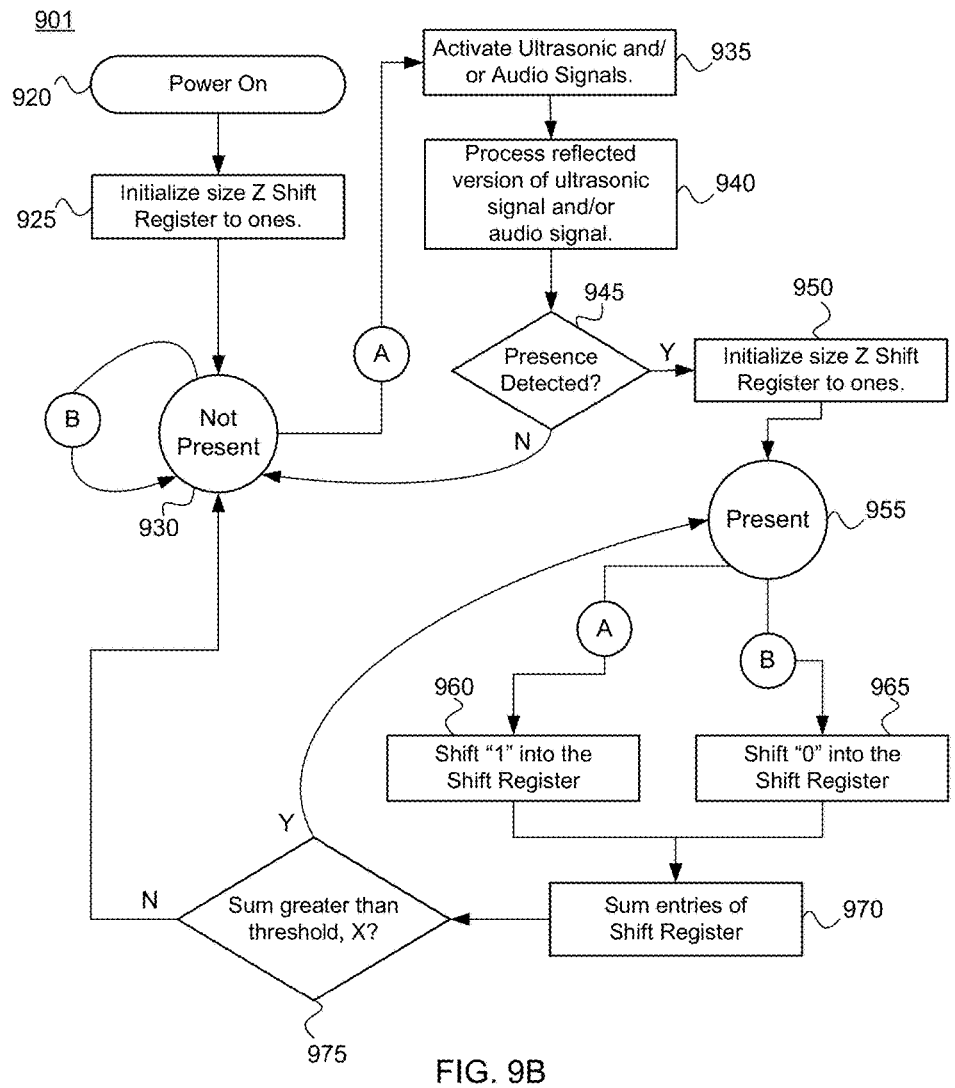
FIG. 9B is a flow diagram of a method for confirming the presence decisions generated in the method of FIG. 9A, according to various embodiments.

FIG. 9A is a flow diagram of a method 900 for generating presence decisions through execution of a supervised ML model on newly received data, according to one embodiment. FIG. 9B is a flow diagram of a method 901 for confirming the presence decisions generated in the method of FIG. 9A, according to various embodiments. Methods 900 and 901 may be performed by processing logic (e.g., decision logic) that may comprise hardware (e.g., circuitry, dedicated logic, programmable logic, microcode, etc.), software (such as instructions running on the processor), firmware or a combination thereof. In one embodiment, a processor of the wireless detector 104, of the computing device 150, or of the wireless device 200 performs the method 500. Alternatively, other components of a disclosed device may perform some or all of the operations of the methods 900 and 901.

With further reference to FIG. 9A, the method 900 may begin with the processing logic pre-processing first data indicative of channel properties of a first communication link between a wireless receiver (e.g., in the wireless detector 104) and a wireless transmitter located elsewhere within a building (905). The method 900 may continue with the processing logic executing a supervised machine learning (ML) model on the pre-processed data (910). The method 900 may continue with the processing logic determining presence (e.g., a presence event) based on execution of the supervised ML model (915). This determination may be performed as discussed with reference to the classification stage 551 of FIG. 5, to generate a binary presence decision, e.g., present (A) or not present (B). These binary decisions (A or B) may be every time interval (such as every two seconds or three seconds or longer) and will be referenced as "A" or "B" with reference to FIG. 9B.

With further reference to FIG. 9B, the method 901 may begin with powering on the processing device in which resides the processing logic, e.g., to perform initiation of decision logic (920). The processing logic that executes the method 901 may be performed by a state machine in one embodiment, although a programmable processor or other logic may also be employed. The method 901 may continue with the processing logic initializing entries in a shift register of a determined size (e.g., size Z) to ones (925). In another embodiment, the initialization may be to zeros where the logic explained below is reversed. This initialization assumes the presence will be confirmed, once detected, but transitions to a Not Present state initially and remains in the Not Present state so long as the supervised ML model does not detect presence (indicated as B in FIG. 9A) (930). In response to a presence detection of a human in the room (indicated as A in FIG. 9B), the method 901 may continue with the processing logic activating one of an ultrasonic signal or an audio signal (935). The method 901 may continue with processing logic processing a reflected components of the one of the ultrasonic signal or the audio signal to confirm the presence (e.g., a presence event) of the human in the room, e.g., resulting in a confirmed presence decision (940).

With continued reference to FIG. 9B, the method 901 may continue with determining whether presence is detected with use of the ultrasound and/or audio as previously described (945). If not, then the method 901 may continue with the processing logic transitioning back to the "Not Present" state (930). If yes, then the method 901 may continue with the processing logic again initializing the entries of the shift register to ones (950). The method 901 may continue with the processing logic transitioning to a Present state (955). As the determination at block 915 in FIG. 9A continues to be made after passage of each time interval, the method 901 may continue with the processing logic shifting into the state machine a "1" upon presence detection (A in FIG. 9A) (960) and a "0" upon no presence detection (B in FIG. 9A) (965).

Note that this logic may be reversed if entries in the shift register were initially set to zeros. The method 901 may continue with the processing logic summing the entries of the shift register (970).

The method 901 may continue with the processing logic determining whether the sum is greater than a determined threshold (e.g., X) (975). If the sum is not greater than X, then the method 901 may continue with the processing logic again transitioning back to the Not Present state (930). If the sum is greater than X, then the method 901 may continue with the processing logic remaining in the Present state (955). In this way, the logic (e.g., state machine) may remain in the Present state so long as the supervised ML model execution results in detection of the human over a time period of a predetermined window of time, to avoid generation of a false-positive detection of the human. If, however, sufficient zeros are shifted into the shift register for failure to detect the human during the time period, the value sum of the entries in the shift register will fall below the threshold, X, and the logic will revert back to Not Present (930).

While the method 901 of FIG. 9B describes the use of a shift register to track presence detections, the method 901 may also employ a counter that is incremented or decremented, or other logic capable of track the presence detections within a time window. For example, the method 901 of FIG. B may include the processing logic initializing a counter to a predetermined value at blocks 925 and 935. In response to a presence decision indicative of presence detection, the method 901 may include the processing logic incrementing the counter by one to generate an updated counter value at block 960. In response to a presence decision indicative of no presence detection, the method 901 may continue with the processing decrementing the counter by one to generate the updated counter value at block 965. The method 901 may then continue by the processing logic setting the number of the presence detections equal to the updated counter value for purposes of performing the comparison to the threshold, X, at block 975.

Figure 10:
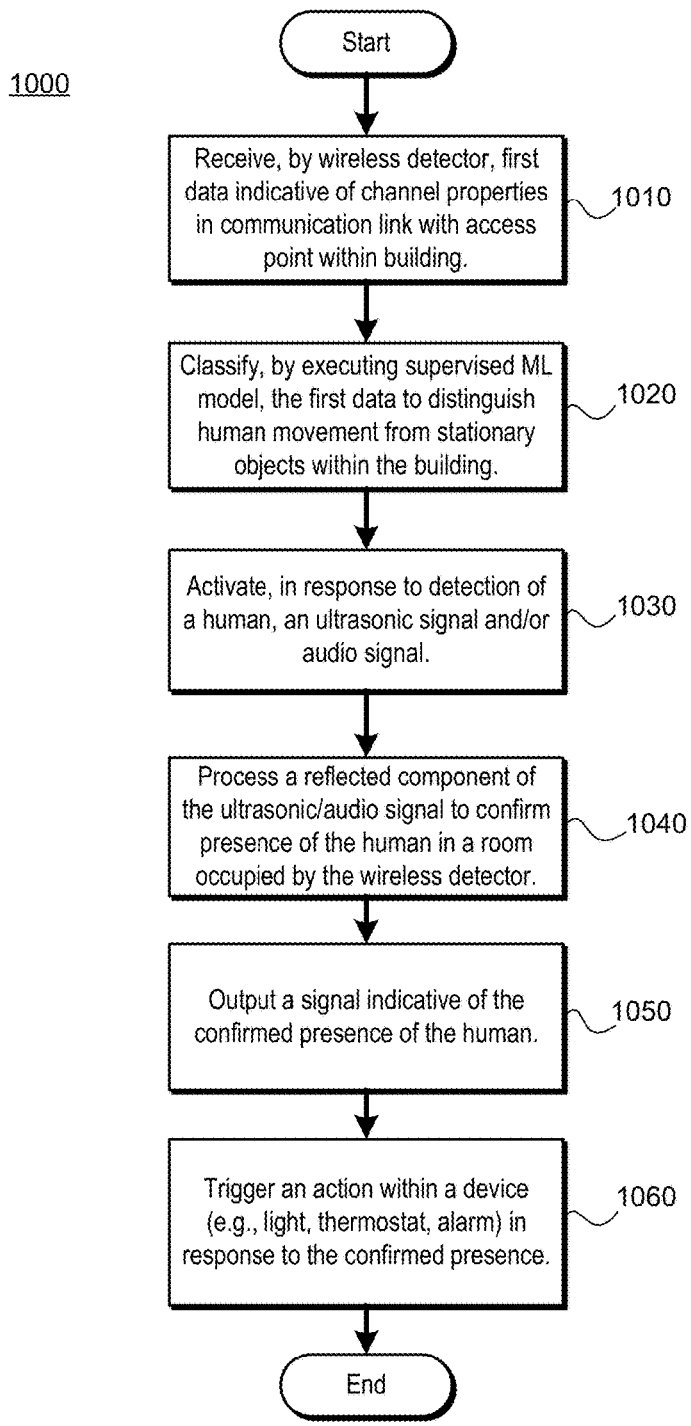
FIG. 10 is a flow diagram of a method for presence detection and confirmation using wireless signals and ultrasonic and/or audio signals, according to embodiments.

FIG. 10 is a flow diagram of a method 1000 for presence detection and confirmation using wireless signals and ultrasonic and/or audio signals, according to embodiments. Method 1000 may be performed by processing logic that may comprise hardware (e.g., circuitry, dedicated logic, programmable logic, microcode, etc.), software (such as instructions running on the processor), firmware or a combination thereof. In one embodiment, a processor of the wireless detector 104, of the computing device 150, or of the wireless device 200 performs the method 1000. Alternatively, other components of a disclosed device may perform some or all of the operations of the method 1000.

With further reference to FIG. 10, the method 1000 may begin with the processing logic receiving first data indicative of channel properties of a first communication link between a wireless receiver of a wireless detector (e.g., first wireless device) and a wireless transmitter in an access point device (e.g., second wireless device), the wireless detector and the access point device being located in a building or at a same vicinity within the building (1010). The method 1000 may continue with the processing logic classifying, by a processor of the wireless detector executing a supervised machine learning (ML) model, the first data to distinguish human movement within the building from stationary objects, to detect presence of a human (1020). The method 1000 may continue with the processing logic activating (or triggering activation of), in response to detection of the human, an ultrasonic signal (or an audio signal) (1030). The method 1000 may continue with the processing logic processing a reflected component of the ultrasonic signal (and/or the audio signal) to confirm the presence of the human in a room occupied by the wireless detector (1040). The method 1000 may continue with the processing logic outputting (or causing to be output) a signal indicative of confirmed presence of the human at the same vicinity, e.g., in the room of the building (1050). The method 1000 may further continue with the processing logic triggering an action within a device (such as a light switch, a thermostat, an alarm, a security system, and the like) in response to the confirmed presence (1060).

Figure 11:
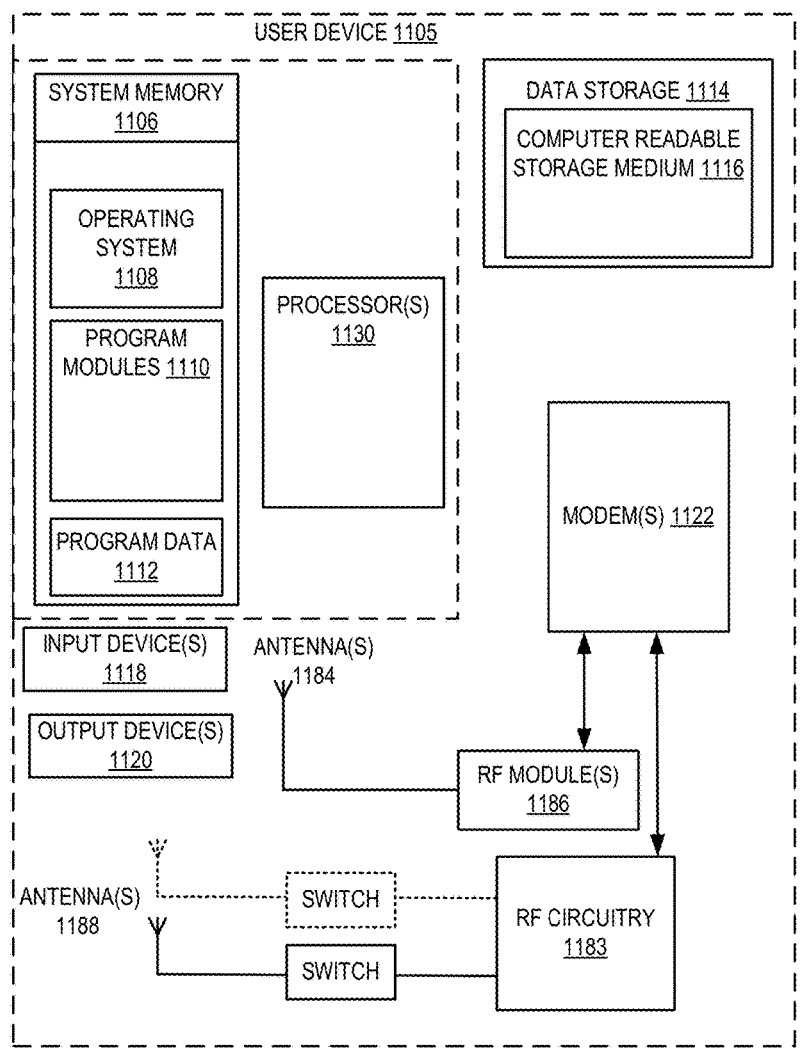
FIG. 11 is a block diagram of a user device in which embodiments of capturing channel properties for supervised ML processing may be implemented.

FIG. 11 is a block diagram of a user device 1105 in which embodiments of capturing channel properties for supervised ML processing may be implemented. The user device 1105 may correspond to the wireless detector 104, the access point device 110, or the wireless device 200 of FIGS. 2A and 2B. The user device 1105 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1105 may be any portable or stationary user device. For example, the user device 1105 may be an intelligent voice control and speaker system. Alternatively, the user device 1105 can be any other device used in a WLAN network (e.g., Wi-Fi® network), a WAN network, or the like.

The user device 1105 includes one or more processor(s) 1130, such as one or more CPUs, microcontrollers, field programmable gate arrays, or other types of processors. The user device 1105 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of the methods 400, 440, and 700 as described herein. The user device 1105 performs functions by using the processor(s) 1130 to execute instructions provided by the system memory 1106.

The user device 1105 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the user device 1105, the system memory 1106 and the processor(s) 1130 also constituting computer-readable media. The user device 1105 may also include one or more input devices 1118 (keyboard, mouse device, specialized selection keys, etc.) and one or more output devices 1120 (displays, printers, audio output mechanisms, etc.).

The user device 1105 further includes a modem 1122 to allow the user device 1105 to communicate via a wireless network (e.g., such as provided by the wireless communication system) with other computing devices, such as remote computers, an item providing system, and so forth. The modem 1122 can be connected to RF circuitry 1183 and zero or more RF modules 1186. The RF circuitry 1183 may be a WLAN module, a WAN module, PAN module, or the like. Antennas 1188 are coupled to the RF circuitry 1183, which is coupled to the modem 1122. Zero or more antennas 1184 can be coupled to one or more RF modules 1186, which are also connected to the modem 1122. The zero or more antennas 1184 may be GPS antennas, NFC antennas, other WAN antennas, WLAN or PAN antennas, or the like. The modem 1122 allows the user device 1105 to handle both voice and non-voice communications (such as communications for text messages, multimedia messages, media downloads, web browsing, etc.) with a wireless communication system. The modem 1122 may provide network connectivity using various types of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 1122 may generate signals and send these signals to antenna 1188, and 1184 via RF circuitry 1183, and RF module(s) 1186 as descried herein. User device 1105 may additionally include a WLAN module, a GPS receiver, a PAN transceiver and/or other RF modules. These RF modules may additionally or alternatively be connected to one or more of antennas 1184, 1188. Antennas 1184, 1188 may be configured to transmit in different frequency bands and/or using different wireless communication protocols. The antennas 1184, 1188 may be directional, omnidirectional, or non-directional antennas. In addition to sending data, antennas 1184, 1188 may also receive data, which is sent to appropriate RF modules connected to the antennas.

In one embodiment, the user device 1105 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band and the second wireless connection is associated with a second resonant mode of the antenna building that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1122 is shown to control transmission and reception via antenna (1184, 1188), the user device 1105 may alternatively include multiple modems, each of which is configured to transmit/receive data via a different antenna and/or wireless transmission protocol.

The user device 1105 delivers and/or receives items, upgrades, and/or other information via the network. For example, the user device 1105 may download or receive items from an item providing system. The item providing system receives various requests, instructions and other data from the user device 1105 via the network. The item providing system may include one or more machines (e.g., one or more server computer systems, routers, gateways, etc.) that have processing and storage capabilities to provide the above functionality. Communication between the item providing system and the user device 1105 may be enabled via any communication infrastructure. One example of such an infrastructure includes a combination of a wide area network (WAN) and wireless infrastructure, which allows a user to use the user device 1105 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1105.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1105 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device located at a first location within a building, the wireless device comprising:
   an antenna;
   a wireless local area network (WLAN) receiver coupled to the antenna;
   a communication interface coupled to the WLAN receiver, the communication interface to receive first data, wherein the first data includes channel properties of a first communication link between the WLAN receiver and a WLAN transmitter located at a second location in the building, the channel properties comprising channel state information (CSI); and
   a processor coupled to the communication interface, the processor to:
      pre-process the first data to generate pre-processed first data;
      execute a fast Fourier transform (FFT) on the pre-processed first data to generate a data stream that contains frequency domain information of the pre-processed first data;
      extract frequency components from the data stream to generate Doppler spectrum data, wherein the frequency components comprise data points located between direct current (DC) and approximately 30 Hz, which are indicative of movement of a human within the building;
      classify, via execution of a supervised machine learning (ML) model, the Doppler spectrum data to identify (i) the movement of the human within the building and (ii) stationary objects within the building, to detect presence of the human at the first location within the building;
      activate, in response to detection of the presence of the human, an ultrasonic signal or an audio signal;
      receive a reflected component of the ultrasonic signal or the audio signal;
      confirm the presence of the human at the first location based on the reflected component; and
      trigger a light switch to a turn on a light at the first location.

2. The wireless device of claim 1, wherein the processor is further to:
   extract, from the pre-processed first data, statistical parameter values over a time period, the statistical parameter values comprising one or more of, related to the pre-processed first data, a maximum value, a minimum value, a mean value, a variance value, an entropy value, a mean cross rate value, a skewness value, or a kurtosis value, wherein the statistical parameter values are useable as feature values to define the supervised ML model;
   stack the statistical parameter values with the Doppler spectrum data within a one-dimensional vector, to generate a dataset for the supervised ML model that contains frequency domain and time domain feature values; and
   classify, via execution of the supervised ML model, data of the dataset to detect the presence of the human.

3. The wireless device of claim 2, wherein the communication interface is to receive the first data over a second time period, wherein the processor is further to:
   update the dataset at a time interval during the second time period;
   repeatedly classify, at the time interval during the second time period and using the supervised ML model, the data of the dataset to generate a plurality of presence decisions; and determine that a number of presence detections within the plurality of presence decisions exceeds a threshold number, to avoid a false-negative detection of the human.

4. The wireless device of claim 1, wherein the first location is in a room of the building and wherein to confirm the presence of the human at the first location is to confirm the presence of the human in the room.

5. A method comprising:
receiving, by a first wireless device, first data indicative of channel properties of a first communication link between the first wireless device and a second wireless device, the first wireless device and the second wireless device being located in a same vicinity, and the channel properties comprising channel state information (CSI);
detecting, using a supervised machine learning (ML) model applied to the first data, human movement and presence of stationary objects within the same vicinity;
activating, by the first wireless device in response to detection of the human movement, an ultrasonic signal;
receiving, by the first wireless device, a reflected component of the ultrasonic signal; and
confirming, by the first wireless device using the reflected component, presence of a human in the same vicinity; and
outputting, by the first wireless device, a signal indicative of confirmed presence of the human in the same vicinity.

6. The method of claim 5, wherein the reflected component comprises a first reflected component, the method further comprising:
activating, by the first wireless device in response to detection of the human, an audio signal; and
determining, by the first wireless device using a second reflected component of the audio signal, the presence of the human in the same vicinity.

7. The method of claim 5, wherein the receiving the first data is performed over a time period, the method further comprising:
repeatedly classifying, at a time interval during the time period and via execution of the supervised ML model, the first data to generate a plurality of presence decisions; and
determining that a number of presence detections within the plurality of presence decisions exceeds a threshold number, to avoid a false-negative detection of the human.

8. The method of claim 5, wherein the first wireless device is located in a room of a building, the second wireless device is located in an area of the building outside of the room, and wherein the confirming the presence of the human in the same vicinity also confirms the presence of the human in the room.

9. The method of claim 5, wherein the detecting comprises classifying, via execution of the supervised ML model, the first data according a plurality of pre-trained classifiers, which comprise a first pre-trained classifier associated with human movement within the same vicinity and a second pre-trained classifier associated with one or more of the stationary objects located at the same vicinity.

10. The method of claim 5, further comprising:
pre-process the first data to obtain pre-processed first data;
executing a fast Fourier transform (FFT) on the pre-processed data to generate a data stream that contains frequency domain information of the pre-processed first data;
extracting frequency components from the data stream that are indicative of the human movement, to generate Doppler spectrum data; and
classifying, via execution of the supervised ML model, the Doppler spectrum data to detect presence of the human.

11. The method of claim 10, wherein the frequency components comprise data points within the data stream between direct current (DC) and approximately 30 Hz.

12. The method of claim 10, the method further comprising:
extracting, from the pre-processed first data, statistical parameter values over a time period, wherein the statistical parameter values are useable as feature values to define the supervised ML model;
stacking the statistical parameter values with the Doppler spectrum data within a one-dimensional vector, to generate a dataset for the supervised ML model; and
classifying, via execution of the supervised ML model, data of the dataset to detect the presence of the human.

13. The method of claim 12, wherein the first data is received over a second time period, the method further comprising:
updating the dataset at a time interval during the second time period;
repeatedly classifying, at the time interval during the second time period and using the supervised ML model, the data of the dataset to generate a plurality of presence decisions; and
determining that a number of presence detections within the plurality of presence decisions exceeds a threshold number, to avoid a false-negative detection of the human.

14. A non-transitory computer-readable medium comprising instructions which, when executed by a first wireless device located at a first location within a building, causes the first wireless device to perform operations comprising:
retrieving first data indicative of channel properties of a first communication link between the first wireless device and a second wireless device, the second wireless device being located at a second location in a building, and wherein the channel properties comprise channel state information (CSI);
detecting, via execution of a supervised machine learning (ML) model using the first data, human movement and stationary objects within wireless range of the first location in the building;
triggering activation of an ultrasonic signal in response to detection of the human movement;
retrieving data containing a reflected component of the ultrasonic signal that is received by the first wireless device; and
confirming, using the data containing the reflected component, presence of a human at the first location; and
triggering out of a signal indicative of confirmed presence of the human at the first location.

15. The non-transitory computer-readable medium of claim 14, wherein the detecting comprises classifying, via execution of the supervised ML model, the first data according a plurality of pre-trained classifiers, which comprise a first pre-trained classifier associated with human movement at the first location and a second pre-trained classifier associated with one or more of the stationary objects located within wireless range of the first location.

16. The non-transitory computer-readable medium of claim 14, wherein the retrieving the first data is performed over a time period, and wherein the instructions further cause the first wireless device to perform the operations comprising:

repeatedly classifying, at a time interval during the time period and via execution of the supervised ML model, the first data to generate a plurality of presence decisions; and in response to a number of presence detections within the plurality of presence decisions exceeding a threshold number, causing output of a signal indicative of confirmed presence of the human at the first location.

17. The non-transitory computer-readable medium of claim 16, wherein the first location is in a room of the building and wherein to confirming the presence of the human at the first location comprises confirming the presence of the human in the room.

18. The non-transitory computer-readable medium of claim 14, wherein the instructions further cause the first wireless device to perform the operations comprising:

triggering activation of an audio signal; and determining, using second data containing a second reflected component of the audio signal, the presence of the human at the first location.

19. The non-transitory computer-readable medium of claim 18, wherein the instructions further cause the first wireless device to perform the operations comprising:

pre-processing the first data to obtain pre-processed first data executing a fast Fourier transform (FFT) on the pre-processed first data to generate a data stream that contains frequency domain information of the pre-processed first data;

extracting frequency components from the data stream that are indicative of the human movement, to generate Doppler spectrum data, wherein the frequency components comprise data points within the data stream between direct current (DC) and approximately 30 Hz; and classifying, via execution of the supervised ML model, the Doppler spectrum data to detect the presence of the human.

20. The non-transitory computer-readable medium of claim 19, wherein the instructions further cause the first wireless device to perform the operations comprising:

extracting, from the pre-processed first data, statistical parameter values over a time period, wherein the statistical parameter values are useable as feature values to define the supervised ML model;

stacking the statistical parameter values with the Doppler spectrum data within a one-dimensional vector, to generate a testing dataset for the supervised ML model; and classifying, via execution of the supervised ML model, data of the testing dataset to detect the presence of the human.

* * * * *